Sept. 7, 1926.
J. G. CAPSTAFF
1,598,956
PHOTOGRAPHIC MULTIPLE PROJECTION PRINTER
Filed Jan. 21, 1922  3 Sheets-Sheet 1
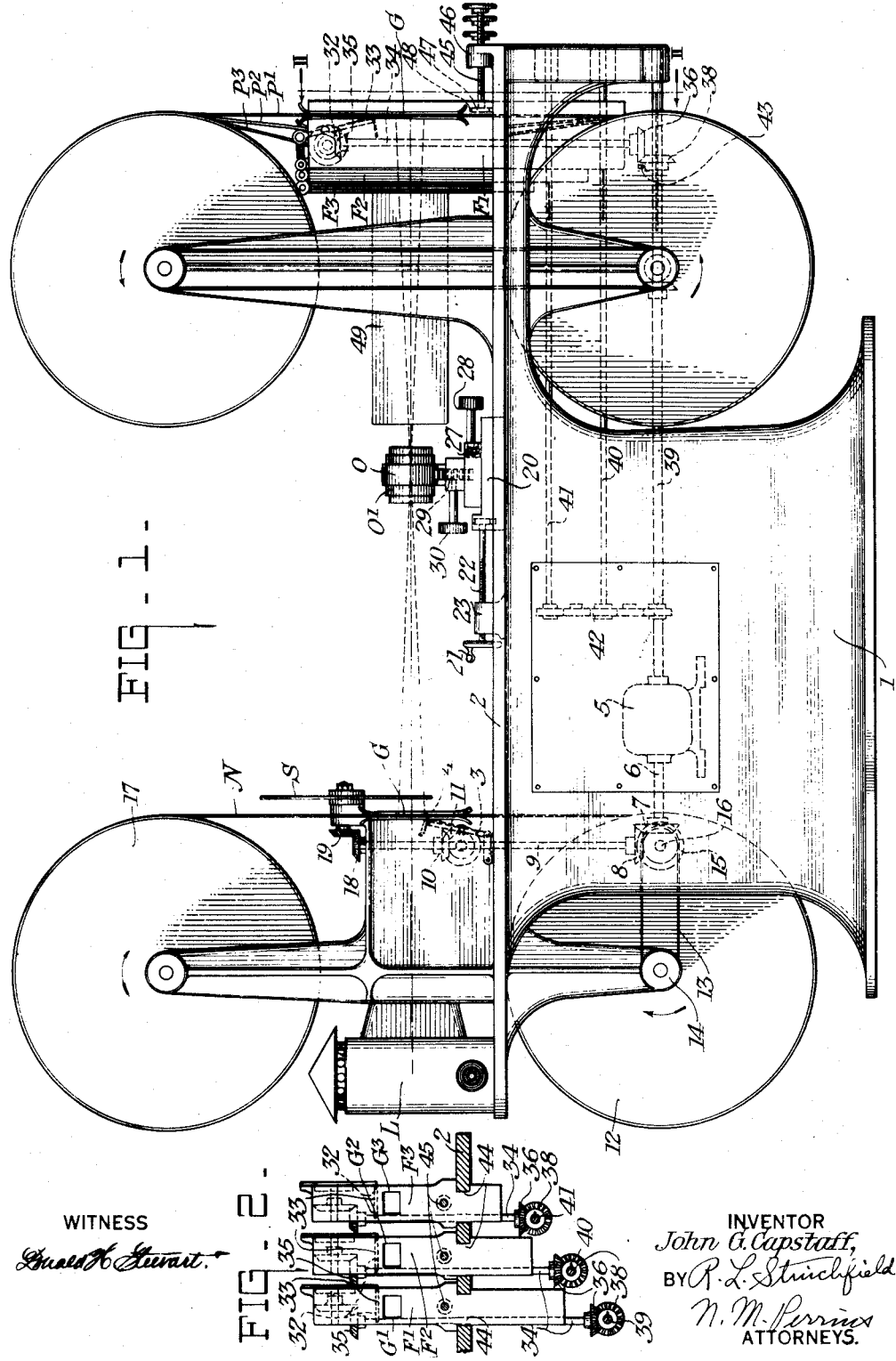
WITNESS
INVENTOR
John G. Capstaff,
BY
ATTORNEYS.

Sept. 7, 1926.  
J. G. CAPSTAFF  
1,598,956  
PHOTOGRAPHIC MULTIPLE PROJECTION PRINTER  
Filed Jan. 21, 1922   3 Sheets-Sheet 2
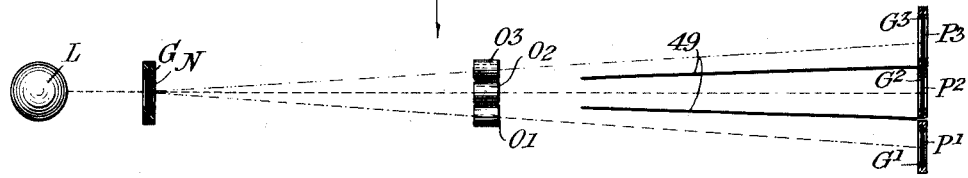
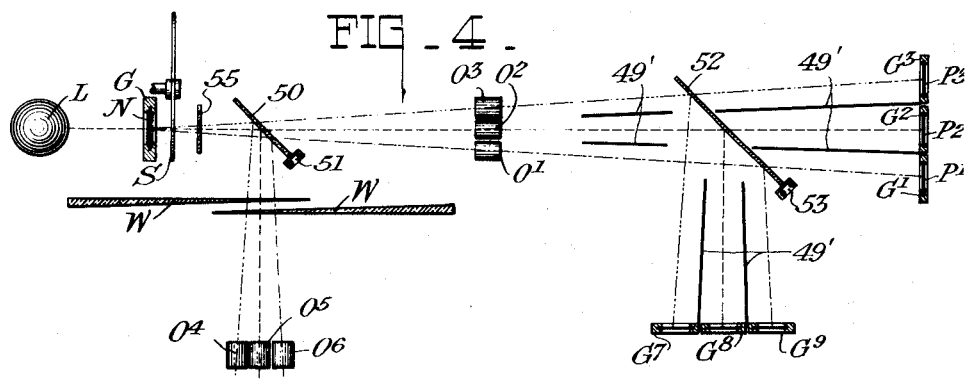
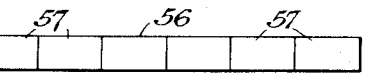
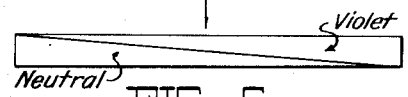
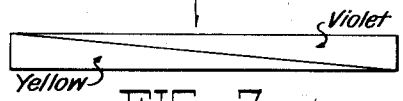
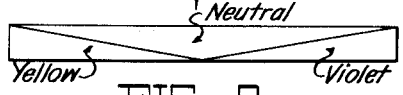
WITNESS
INVENTOR  
John G. Capstaff,  
BY  
ATTORNEYS.

Sept. 7, 1926. 1,598,956
J. G. CAPSTAFF
PHOTOGRAPHIC MULTIPLE PROJECTION PRINTER
Filed Jan. 21, 1922 3 Sheets-Sheet 3
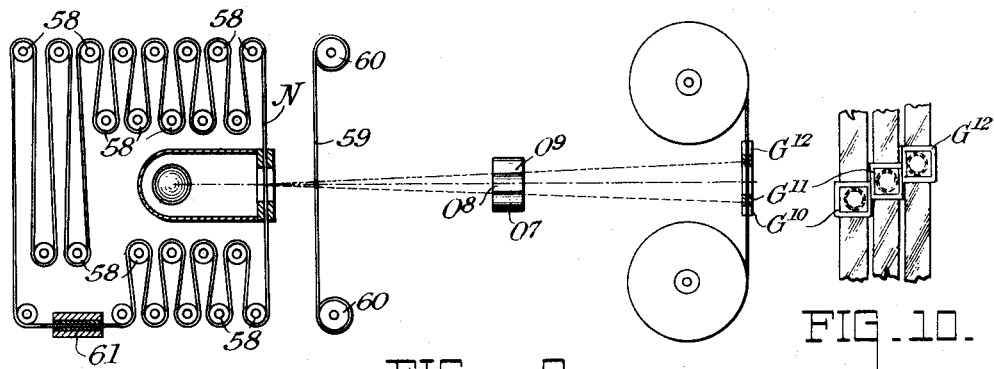
FIG. 9.
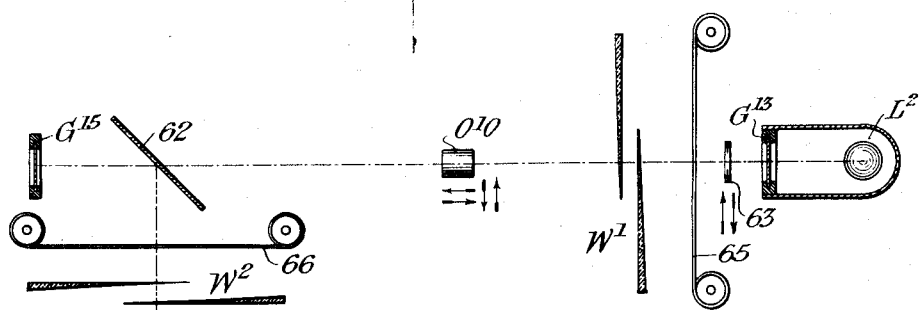
FIG. 10.
FIG. 11.
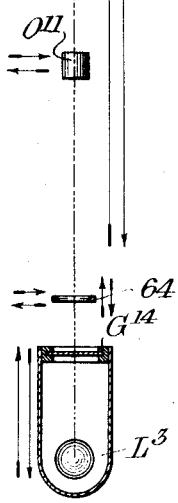
WITNESS
INVENTOR
John G. Capstaff,
BY
ATTORNEYS.

Patented Sept. 7, 1926.

1,598,956

UNITED STATES PATENT OFFICE.

JOHN G. CAPSTAFF, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC MULTIPLE PROJECTION PRINTER.

Application filed January 21, 1922. Serial No. 530,942.

This invention relates to a photographic multiple projection printer, by which I mean an apparatus designed to print simultaneously, photographically, by projection, a plurality of images. More especially it relates to printers of this type designed for the printing of long strips of motion picture film, in which either a plurality of copies are simultaneously made from a single master film, or in which images from a plurality of films at different gates are simultaneously thrown upon a single film at one exposure gate.

The objects of my invention are to make possible the economic reproduction of large editions of films, to utilize a single master negative for the printing of much larger editions than is now possible; to make controlled changes in magnification, framing and tone gradation in such prints; to make combined images from a plurality of films with provision for suitable changes in the relative density, tone gradation, position and magnification of the two images, so that they may be combined to produce any desired form of combined image. These and other ends, which will hereafter be apparent, are attained by the apparatus of my invention, certain exemp'ary forms of which are disclosed in the following description and in the accompanying drawings to which reference will now be made, in which like reference characters designate like parts throughout, and in which Fig. 1 is a side elevation of one form of my improved printer;

Fig. 2 is section on line II—II showing only the printing gate portion and certain connected mechanism;

Fig. 3 is a diagram of the optical system of said printer;

Fig. 4 is a diagram of a modified optical system;

Fig. 5 is a view of one form of a color filter usable with my improved machine;

Figs. 6 to 8 are diagrammatic views of other forms of wedges;

Fig. 9 is a diagrammatic elevation of a modified system;

Fig. 10 is a diagrammatic view of the same system showing the relative positions of objectives and gates;

Fig. 11 is a diagram of another printer embodying my invention.

In the accompanying drawing I have illustrated in Fig. 1, an operative machine embodying my invention. Inasmuch as the mechanical details of this apparatus are of the usual kind employed in the design of such machines, I have considered that the showing of these in full in connection with the many possible modifications embodying the principles of my invention would only confuse the disclosure and obscure the real invention. In the remaining figures I have, therefore, indicated fully the nature of the modifications which they are intended to disclose, the details of the mechanisms being understood to be of any kind familiar to those skilled in the art.

A hollow, rigid base or support 1 is used with a table-like top 2. In and on this support are carried the various elements of the machine. In the machine here shown, a negative film gate G is mounted at one end, with a lamp house L behind it designed to illuminate the gate. A mechanism 3, here shown as of an intermittent type with claws 4, is adapted to engage the usual perforations and pull down the negative film N. This mechanism is driven from a motor 5, within the base 1, by any suitable arrangement of shafts and gears such as shaft 6, bevel gears 7, 8, shaft 9, and bevel gears 10, 11. The take-up reel 12, is driven by a friction slip belt 13 passing over pulley 14 and driven from pulley 15 which is mounted on shaft 16, driven by a bevel gear in mesh with gear 7. The film N is drawn from the supply reel 17. A shutter S of the familiar rotary disc type is driven from shaft 9 by bevel gears 18, 19 in properly timed relation to the pulldown mechanism.

The table 2 supports a series of lenses in suitable mounts O, only one appearing in Fig. 1. Each of these mounts is adjustable to permit of movement in any direction. Slidable longitudinally of the table are beds 20 adjustable by means of the screw 22 engaging the internally screw threaded fixed mount 23 and having an operating handle 21 and a freely turning head 24 engaging a suitable socket 25 in the bed 20. Slidable transversely of bed 20 is a second bed 26, adjustable by means of the rack and pinion 27 and thumb nut 28. The mount O is further adjustable vertically on bed 26 by the rack and pinion 29 and thumb nut 30. A series of frames F¹, F² and F³ are mounted at the other end of the table. Each of these frames is mounted for adjustment in slots 44 longitudinally of the table. They are partly shown in Fig. 1 in staggered relation for the sake of clearness, though ordinarily they would be substantially in alignment. In each of these is a gate G¹, G² or G³, past which a long strip of positive film P¹, P² or P³ may be drawn by film advancing mechanism 32, here shown as of an intermittent type with claws 33 adapted to engage the usual perforations in the film in a direction opposite to that of the movement of the negative film N past gate G. The mechanisms 32 are carried, each by its corresponding frame, in each of which is mounted a vertical shaft 34, having upper and lower bevel gears 35 and 36, the gear 35 engaging bevel gear 37, actuating mechanism 32, and the gear 36 engaging a bevel gear 38 on a shaft 39, 40 or 41. These shafts are arranged longitudinally of the stand and are driven from the motor 5 by any suitable gearing 42. On each of these shafts is mounted a bevel gear 38, only one, however, being shown in Fig. 1. These gears 38 are splined to the shafts and fixable in longitudinally adjustable position by set screws 43. The frames are adjusted in the slots 44 by means of the hand screws 45 working through fixed projections 46 in the table and having heads 47 freely turning in sockets 48 in their respective frames. Suitable partitions 49 may separate the beams of light. It is to be understood that the axes of the objectives are parallel to each other and perpendicular to the plane of the gates, and that the objectives are of such a focal length that the gate subtends only a small angle and they have a sufficiently wide field to reproduce accurately the image at the plane of G in the parallel gates G¹, G² or G³.

The operation of the printer as thus far described is apparent. A test negative is placed in the gate G and focusing screens in the printing gates G¹, G² and G³. The objectives O¹, O² and O³ are then adjusted, the gates G¹, G² and G³ being also adjusted if necessary until the image of the test negative is properly in focus at each of the printing gates. It is obvious that the magnification of the projected image may be altered so that the instrument may be used in printing upon film of different size than the original. It is sometimes found that a negative includes objectional features near the edge due to faulty composition. It is customary in such cases to set up and retake the scene. But with this apparatus the magnification can be increased so that the projected image is larger than the printing gate and the objective is shifted so that objectionable marginal portions will not fall on the printing gate, which is, nevertheless, covered by the magnified remainder of the scene.

In Figure 4, I have indicated certain desirable modifications. A semi-transparent mirror 50, transmitting and reflecting light uniformly, is pivoted at 51 obliquely across the projected beams, between the gate G and the objectives O¹, O² and O³ so that part of the light reflected to a second set of objectives O⁴, O⁵ and O⁶ and thence to the printing gates G⁴, G⁵ and G⁶. These objectives and gates are similar to those already described. A second similar light-splitting mirror 52 pivoted at 53 may be mounted between the objectives O¹, O² and O³ and the printing gates G¹, G² and G³ reflecting a part of the light to printing gates G⁷, G⁸ and G⁹, the latter being similar in construction to those already described. The mirrors can be swung on their pivots out of the beam if it is not desired to utilize them. Suitable partitions 49' may be used in such an apparatus. The shutter is indicated at S.

As the printing time at each gate is the same it is necessary that the intensity of light be the same at all gates. A density wedge or screen to control light intensity may, therefore, be introduced into any beam that is stronger than others as indicated at W in Fig. 4, the one shown being of the type where two opposite wedges are introduced from opposite sides into the beam to insure uniform intensity across the beam. With the arrangement shown in Fig. 4 the image is laterally inverted if, as is usual, the emulsion side of the positive side faces the lens, at gates G⁴ to G⁹. If desired the emulsion side may be faced away from the lens and the image projected through the support, thus rectifying such an inversion.

I also propose controlling the contrast of the printed images. At present it is possible to control printing density by the use of graded screens interposed in the printing light and to control contrast by the time of development, but the latter expedient is particularly undesirable since all development is preferably formed by standard processes by workmen quite independent of the printers. It has long been known that wave length of light affects slightly the gradation of the exposed image, and I propose to introduce into the beam of printing light a color screen to change the contrast scale of the resulting print. Such a screen is indicated at 55 in Fig. 4, the type of screen being any of those to be hereinafter described.

This contrast-controlling screen may consist of a strip of film having different areas differently colored as indicated in Fig. 5. In this case a film 56 is shown having a series of areas 57, having different color transmission characteristics. If desired the screen may be of the wedge type as indicated in Fig. 6, where a wedge of violet is shown. Attached to this and oppositely arranged is a neutral wedge, the densities of the wedges being so balanced that the printing time is uniform for any position of the wedge, but the resulting contrast will vary. As shown in Fig. 7, the screen may be made of two oppositely directed wedges transmitting light of color having opposite effects such as yellow and violet. Still another type of wedge is shown in Fig. 8, in which the violet wedge is placed point to point to the yellow wedge and both balanced by a neutral wedge. It is to be understood that with any of the above described wedges or screens, printing light transmitted through the yellow wedge tends to increase the contrast of the resulting print and violet light tends to diminish it. This control is very much increased if the sensitive emulsion is dyed with a dye that absorbs the wave lengths to which the emulsion is most sensitive. As the emulsions most used for printing are sensitized strongly for blue, the contrast of the resulting print can be controlled in a remarkable manner if the film is dyed yellow. Normal exposures will then be made through the central part of the wedge shown in Figs. 7 or 8. If the negative is flat, exposure is made through the yellow end of the wedge to increase contrast, and if it is too contrasty the violet end is used. If the screen is of the type shown in Fig. 5, the areas are made so that they will correspond to a series of sections taken along wedges of the type disclosed in Figs. 6, 7 and 8. In any of the disclosed screens I find it desirable that the adjustment of the wedge shall not affect printing time but only the contrast, and this end is attained by the use of the balancing neutral wedge. It is to be understood that Figs. 6 to 8 are diagrammatic and the wedges are made very long and tapering.

In Fig. 9, I have indicated in a diagram, certain slight variations. The negative film N instead of being wound from one reel to another is in the form of a continuous strip passing over a series of idle rolls 58. A contrast controlling screen 59 of the type shown in Fig. 5, is indicated as supported by two reels 60 between which it is wound until the desired area is in the beam of light. A film cleaning apparatus 61 of any desired type may be placed in the path of the negative film. These objectives $O^7$, $O^8$ and $O^9$ are indicated, and as shown they are not on a horizontal line, but are arranged with one side objective below and the other above the middle one. The corresponding gates $G^{10}$, $G^{11}$ and $G^{12}$ are similarly arranged. This arrangement is indicated in Fig. 10. It is to be understood that the objectives and the gates are preferably adjustable in a manner similar to that already described in connection with Fig. 1.

In printing from negative films it is customary to make editions which, even with the most popular plays, seldom, if ever, run over four hundred copies and with most plays are limited to less than fifty. It is thus possible to use the original negatives which do not not deteriorate noticeably with such a number of passages through the printer. It is also customary to clean the negative after every printing. My printer, as above described, is designed to meet a quite different situation. I propose to make extremely large editions of plays on film of small dimension, the picture area being, for instance, one-sixth standard. By my apparatus I can print a considerable number of such films at once, and while the exposure period for each area will be necessarily longer than otherwise, when light-splitting mirrors are used, it will not be increased proportionately to the total number of copies made; and the wear and tear on the negative film will be no greater than if only one copy were made. In this way it is possible to make large editions from the orginal negatives without having to resort to duplicate negatives with their necessarily poorer quality. I find that the negative films have a longer efficient life if backed, as with gelatine.

In Fig. 11 I have illustrated diagrammatically an apparatus involving similar structural features, and embodying my invention, but having a different arrangement of elements. Instead of projecting the image from one gate upon a plurality of gates, images from several gates are thrown upon a common gate. Behind gates $G^{13}$ and $G^{14}$ are placed lamp houses $L^2$ and $L^3$ respectively. Films bearing images can be passed through these gates, the image from $G^{13}$ being projected by objective $O^{10}$ upon the printing gate $G^{15}$. Interposed in this light path is an inclined light-splitting mirror 62. The image from gate $G^{14}$ is projected by objective $O^{11}$ upon the gate $G^{15}$ by reflection from this mirror. There are thus superposed the two images at gate $G^{15}$. The objectives and gates $G^{13}$ and $G^{14}$ are made adjustable by mechanism of the type described, but the longitudinal adjustments of the objectives $O^{11}$ and gate $G^{14}$ are made particularly great to permit wide variation in the size of the image at the gate $G^{15}$. In front of each gate $G^{13}$ and $G^{14}$ is an iris or other diaphragm 63 and 64, which is also adjustable in position as indicated by arrows, permitting any portion of either of these gates to be projected. In each projection path, there is also an adjustable neutral density screen W¹ and W², and a contrast controlling color screen 65 and 66 of the types previously described. The lamp houses L² and L³ are adjustable with the gates G¹³ and G¹⁴ respectively.

The use of this apparatus is apparent. Films are run through gates G¹³ and G¹⁴ and their images superposed at gate G¹⁵, where they may be combined in any way. The relative density, magnification, position and contrast of the two images are controllable to permit of the making of any kind of fade-in, ghost, double exposure, diffused focus effects, vignetting, border designs, or other form of trick picture.

It is possible to fade one image in and the other out simultaneously from strips of uniform images without the necessity of passing the sensitive film twice through the printer. The cameraman when taking the original picture takes a straight picture in the usual way, without having his attention distracted by the necessities of trick photography, and any desired effects can be introduced in the greater leisure of the photographic laboratory.

In every case described, it will be noted that the axes of the objectives are parallel to a line perpendicular to the film gates, or to such a line reflected, that is, to the central ray of the projection system. The objectives are not tilted so as to point to the central point of the single gate, as this would produce distortion. The gates are all perpendicular to the central rays of the projection systems, those in the same set, such as G⁷, G⁸ and G⁹, for instance, being in parallel planes perpendicular to the central ray from the central gate of such set to the single gate.

Where, in this specification, I have referred to a negative film from which a print is to be made, it is to be understood that I do not limit myself to a photographic negative, but I include images, negative or positive, produced by any means.

It is obvious that numerous modifications are possible and I contemplate as within the scope of my invention as defined in the appended claims all such substitutions and equivalents.

Having thus described my invention what I claim as new and desire to secure by Letters Patent is:

1. In apparatus of the class described, a single gate, a plurality of other gates, means for projecting light in the same direction between each of said other gates and said single gate, said means comprising a plurality of independently adjustable objectives, said other gates being independently adjustable whereby both the ratio of the reproduced to the original images may be adjusted and the masking effect for each of the plurality of other gates may be independently adjusted.

2. In apparatus of the class described, a single gate, a plurality of other gates, means for projecting light in the same direction between each of said other gates and said single gate, said means comprising a plurality of independently adjustable objectives, and separate means for moving strips of motion picture film past each of said gates, said last named means being interconnected so that all the films are moved in timed relation.

3. In apparatus of the class described, a single gate, a plurality of independently adjustable objectives on the same side of said single gate, a plurality of other gates corresponding to each of said objectives and so placed that the objectives can project focused images between the single gate and the corresponding other gates, each objective being adjustable axially to vary the focus of the projected image and being also adjustable laterally to vary the optical axis and the portion of the field that is projected.

4. In apparatus of the class described, a single gate, a plurality of universally and independently adjustable objectives on the same side of said single gate, a plurality of other gates corresponding to each of said objectives and so placed that the objectives can project focused images between the single gate and the corresponding other gates, said other gates being independently adjustable toward and away from said objectives, the said adjustments of the objectives and gates permitting change both in the ratio of the projected and original images and the portion of the field projected.

5. In apparatus of the class described, a single gate, a plurality of universally and independently adjustable objectives on the same side of said single gate, a plurality of other gates corresponding to each of said objectives and so placed that the objectives can project focused images between the single gate and the corresponding other gates, said objectives having their axes parallel to each other and perpendicular to the single gate, the axes of adjacent objectives being located in different horizontal and vertical planes.

6. In apparatus of the class described, a single gate, a plurality of universally and independently adjustable objectives on the same side of said single gate, a plurality of other gates corresponding to each of said objectives and so placed that the objectives can project focused images between the single gate and the corresponding other gates, said objectives having their axes parallel to each other and perpendicular to the single gate, the axes of adjacent objectives being located in different horizontal and vertical planes, said other gates being parallel to the first named gate, and means for moving strips of motion picture film in timed relation past each of said gates.

7. In apparatus of the class described, a single gate, a plurality of other gates, optical means for projecting light between each of said other gates and said single gate, the path of projection in all cases approaching the single gate from the same side, the optical means including independently adjustable objectives mounted parallel to the central ray of the projection path and in different horizontal and vertical planes, the gates being all perpendicular to said central ray.

8. In apparatus of the class described, a single gate, a plurality of other gates, means for projecting light in the same direction between each of said other gates and said single gate, said means comprising a plurality of independently adjustable objectives, and means for moving strips of motion picture film in timed relation past each of said gates, and means for independently adjusting the intensity of the light projected through at least one of said objectives.

9. In apparatus of the class described, a single gate, a plurality of universally and independently adjustable objectives on the same side of said single gate, a plurality of other gates corresponding to each of said objectives and so placed that the objectives can project focused images between the single gate and the corresponding other gates, and an adjustable color screen in said projection system for controlling the contrast of a photographic image produced by the projected light.

Signed at Rochester, New York, this 18th day of January, 1922.

JOHN G. CAPSTAFF.